(12) United States Patent
Leard et al.

(10) Patent No.: US 8,934,048 B2
(45) Date of Patent: Jan. 13, 2015

(54) APPARATUS AND METHODS FOR CAMERA APPLICATIONS

(71) Applicant: Rockwell Automation Technologies, Inc, Mayfield Heights, OH (US)

(72) Inventors: Francis Lawrence Leard, Sudbury, MA (US); James Edward Dogul, Hudson, NH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/692,404

(22) Filed: Dec. 3, 2012

(65) Prior Publication Data
US 2013/0093903 A1   Apr. 18, 2013

Related U.S. Application Data

(63) Continuation of application No. 11/860,921, filed on Sep. 25, 2007, now Pat. No. 8,325,245.

(51) Int. Cl.
*H04N 5/225* (2006.01)
*G03B 11/00* (2006.01)
*H04N 5/33* (2006.01)

(52) U.S. Cl.
CPC ............... *G03B 11/00* (2013.01); *H04N 5/33* (2013.01); *H04N 5/2254* (2013.01)
USPC ........ 348/342; 348/360; 348/224.1; 348/270; 348/273

(58) Field of Classification Search
USPC ............... 348/342, 360, 224.1, 270, 273; 356/5.04, 5.06; 382/104
See application file for complete search history.

(56) References Cited

U.S. PATENT DOCUMENTS

| | | | |
|---|---|---|---|
| 8,325,245 B2 | 12/2012 | Leard et al. | |
| 2006/0049352 A1 | 3/2006 | Irani | |
| 2006/0238741 A1* | 10/2006 | Ninomiya et al. | 356/5.01 |
| 2006/0242186 A1 | 10/2006 | Hurley | |
| 2007/0023661 A1* | 2/2007 | Wagner et al. | 250/338.1 |
| 2007/0247611 A1* | 10/2007 | Tamaki et al. | 356/3.11 |

OTHER PUBLICATIONS

"U.S. Appl. No. 11/860,921, Advisory Action mailed Aug. 16, 2010", 3 pgs.
"U.S. Appl. No. 11/860,921, Final Office Action mailed Jun. 9, 2010", 15 pgs.
"U.S. Appl. No. 11/860,921, Non Final Office Action mailed Dec. 1, 2009", 14 pgs.
"U.S. Appl. No. 11/860,921, Notice of Allowance mailed Aug. 2, 2012", 6 pgs.
"U.S. Appl. No. 11/860,921, Response filed Mar. 1, 2010 to Non Final Office Action mailed Dec. 1, 2009", 10 pgs.
"U.S. Appl. No. 11/860,921, Response filed Aug. 9, 2010 to Final Office Action mailed Jun. 9, 2010", 11 pgs.

(Continued)

*Primary Examiner* — Yogesh Aggarwal
(74) *Attorney, Agent, or Firm* — Schwegman Lundberg & Woessner, P.A.

(57) ABSTRACT

Apparatus and methods for using infra-red light provide for enhanced operation in camera applications. In an embodiment, a safety camera includes an optical filter that provides an input to an imager from received light having wavelengths in the infra-red spectrum. Output from the imager can be analyzed to determine safety hazard events in an area viewed by the safety camera.

18 Claims, 5 Drawing Sheets

(56) References Cited

OTHER PUBLICATIONS

"U.S. Appl. No. 11/860,921, Response filed Sep. 9, 2010 to Advisory Action mailed Aug. 16, 2010", 12 pgs.

Ostrower, Daniel, "Optical Thermal Imaging—replacing microbolometer technology and achieving universal deployment", III-Vs Review: The Advanced Semiconductor Magazine, vol. 19, No. 6, (Aug. 2006), 24-27.

* cited by examiner

APPARATUS AND METHODS FOR CAMERA APPLICATIONS

CROSS-REFERENCE TO RELATED APPLICATION(S)

This application is a continuation application of U.S. application Ser. No. 11/860,921, filed Sep. 25, 2007, entitled "Apparatus and Methods for Use of Infra-Red Light in Camera Applications," now issued on Dec. 4, 2012 as U.S. Pat. No. 8,325,245, which is incorporated herein by reference in its entirety.

BACKGROUND

Factory environments often include machinery that present a risk of personal injury. Safety equipment may be used to provide a reduction of risk of injury to the operator when used on potentially dangerous industrial equipment. The sensing equipment may be programmable to cause the machinery to revert to a safe condition before a person can be placed in a hazardous situation. Unfortunately, the environment in which safety cameras must operate may present an area that is a high optical noise environment such that these systems tend to operate with reduced dynamic range. Enhancements to safety equipment should include the reduction of complexity and/or cost to provide a safe working environment.

BRIEF DESCRIPTION OF THE DRAWINGS

Embodiments of the invention are illustrated by way of example and not limitation in the figures of the accompanying drawings in which.

DETAILED DESCRIPTION

The following detailed description refers to the accompanying drawings that show, by way of illustration, details and embodiments in which the invention may be practiced. These embodiments are described in sufficient detail to enable those skilled in the art to practice embodiments of the present invention. Other embodiments may be utilized and structural, logical, and electrical changes may be made without departing from the inventive subject matter. The various embodiments disclosed herein are not necessarily mutually exclusive, as some embodiments can be combined with one or more other embodiments to form new embodiments. The following detailed description is, therefore, not to be taken in a limiting sense.

Figure 1:
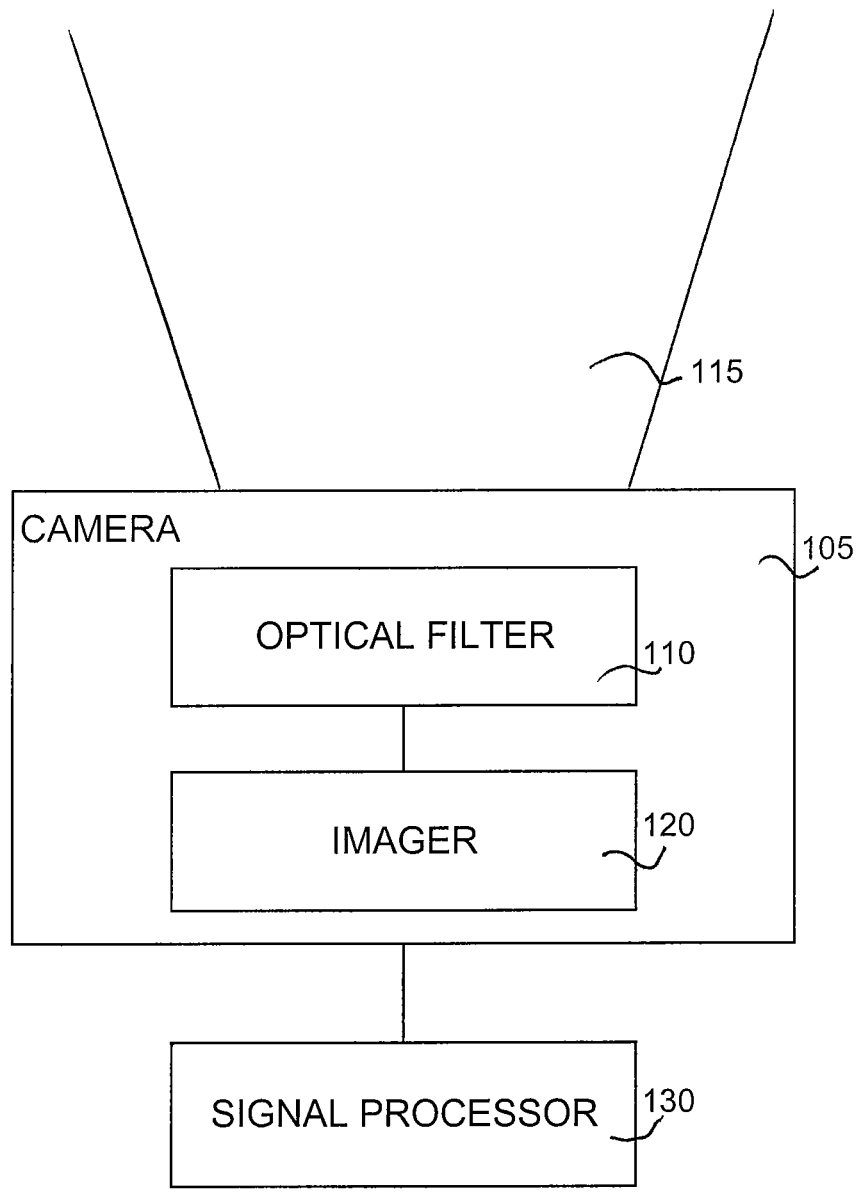
FIG. 1 depicts an embodiment of an apparatus having a camera, which includes an optical filter and an imager, to provide an output to a signal processor.

FIG. 1 depicts an embodiment of an apparatus having a camera 105, which includes an optical filter 110 and an imager 120, to provide an output to a signal processor 130. Radiation received at camera 105 is directed to optical filter 110, which operates on the received radiation, acting as a sensing component. Optical filter 110 can be structured to sense radiation in the wavelength range from 3 µm to 16 µm. Output correlated to the wavelengths sensed by optical filter 110 is provided to imager 120. Imager 120 may be realized in various formats including, but not limited to, a CCD (charge-coupled device) imager, CMOS (complementary metal oxide semiconductor) imager, or combinations thereof. If radiation in a wavelength range from 3 µm to 16 µm is received by optical filter 110, output correlated to this wavelength range is provided to imager 120 that allows processing of infra-red images.

The output from optical filter 110 to imager 120 may be light with wavelengths in the visible spectrum, referred to as visible light. Dependent on the structure to which optical filter 110 is tuned, infra-red radiation incident on optical filter 110 can be absorbed, heating the section of optical filter 110 on which the infra-red radiation is incident. Materials having a high thermo-optic coefficient may be arranged in optical filter 110. A high thermo-optic coefficient provides a significant change of index of refraction per degree of temperature change. As the material absorbs the infra-red radiation, its temperature raises and, with the change in temperature, its index of refraction changes. Since index of refraction affects an optical filter's minimum reflective wavelength, effective tunability of optical filter 110 can be realized based on the choice of materials in the optical filter 110. A light source, coupled to the optical filter, can be used to provide visible light directed onto the optical filter 110, where the visible light may be spatially modulated by the varying index of refraction due to the infra-red radiation received at camera 105 with the spatially modulated light directed to imager 130.

An example of an optical filter to translate thermal long wavelength radiation into light is a passive optical filter used in a product of Redshift Systems Corporation of Burlington, Mass. The product is a form of light valve (LV). A light valve is an optical device that can be used to vary the amount of light to be incident on a target. The amount of light can be controlled by deflecting the light from its path towards the target (a reflective LV) or by blocking the light-path (a transmissive LV). Forms of such devices have been used in projection TVs, flat panel displays, data and video projectors, and rear projection monitors. For example, a DMD (digital mirror-mirror device) reflective LV varies the total amount of light reaching a target by switching, repeatedly in a short time period, between two states (one reflected towards the target and one reflected away from the target. In another example, a transmissive light valve may vary the amount of light reaching the target by using a combination of a polarizing filter and a switching polarizing filter. The Red Shift product is a thermal light valve using a Fabry-Perot (FP) structure.

Signal processor 130 can be applied to analyze the signal received from imager 120. With camera 105 arranged as a safety camera, the analysis can be conducted relative to a safety hazard event associated with sensing radiation with the safety camera from an object in an area. The object would be in the field of view 115 of camera 105. With camera 105 having various optical components, such as but not limited to reflectors and lenses, field of view 115 would be an effective field of view for optical filter 110. Signal processor 130 may be configured to determine an object in the area based on a thermal signature of the object. Signal processor may be configured in a programmable manner such as to be trained to identity objects, varying thermal conditions of objects, and motion of objects in the effective field of view 115 of camera 105. The apparatus may include a machine-readable medium containing instructions, which when implemented by the apparatus, cause the apparatus to perform various operations. In an embodiment, instructions stored in the machine-readable medium may include one or more instruction to apply the signal processor to monitor vector motion of an object in an area, where the object has a thermal signature correlated to a person.

Figure 2:
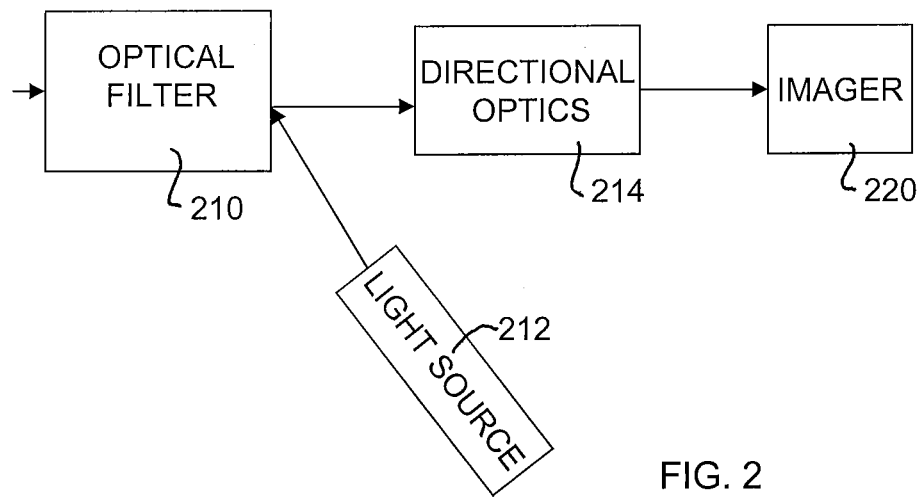
FIG. 2 depicts an embodiment of an arrangement of an optical filter with an imager that may be used in the apparatus of FIG. 1.

FIG. 2 depicts an embodiment of an arrangement of an optical filter 210 with an imager 220 that may be used in the apparatus of FIG. 1. With the light transmissive properties or characteristics of optical filter 210 responsive to incident thermal radiation, light from a light source 212 may be spatially modulated and directed to imager 220 via directional optics 214. Directional optics 214 may include, but is not limited to, mirrors and lenses. Light source 212 may be integrated into a common packaging with the optical filter 210, directional optics 214, and imager 220. Light source 212 may include a laser. Light source 212 may include a diode laser. Light source 212 may include a light emitting diode (LED). Light source 212 may be realized as other appropriate light sources. Light source 212 may include additional optics to direct light to optical filter 210. A thermal image can be obtained by measuring the pixel-to-pixel variation in transmission of the laser probe signal using imager 220. Imager 220 may be realized as a CMOS imager.

Figure 3:
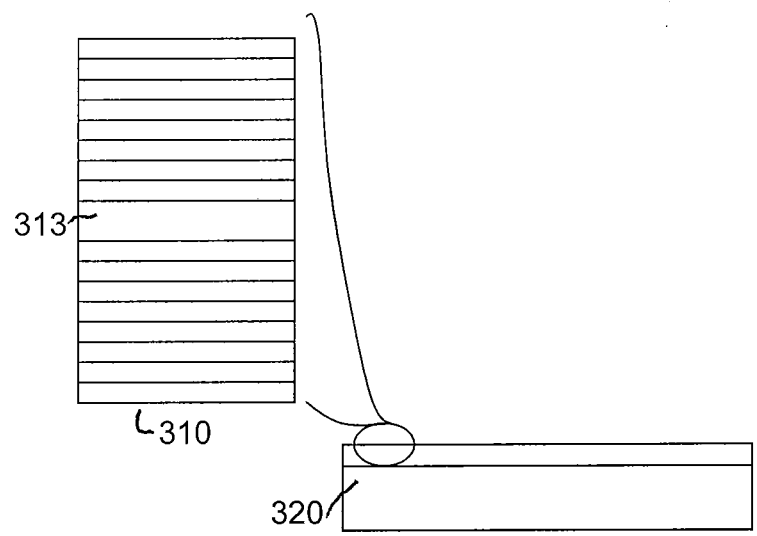
FIG. 3 shows an embodiment of an optical filter and CMOS imager that may be used in the apparatus of FIG. 1.

FIG. 3 shows an embodiment of an optical filter 310 and CMOS imager 320 that may be used in the apparatus of FIG. 1. Optical filter 310 includes a resonant Fabry-Perot stack of layered structured atop two-dimensional CMOS imager 320. Optical filter 310 includes a half-wave section 313 in the Fabry-Perot stack, where half-wave section 313 is composed of a semiconductor with a high absorption in the IR band. In operation, IR radiation is absorbed in half-wave section 313 of the Fabry-Perot filter, which modifies how this region passes visible light. An IR image may be transferred as a spatially modulated visible image with this technique. The layers of optical filter 310 may be composed of different semiconductor material, based on the application. Such materials include, but are not limited to, amorphous silicon (a-Si), silicon nitride ($SiN_x$). These layers of materials may be deposited and doped using a variety of standard semiconductor processing techniques including, but not limited to, chemical vapor deposition (CVD), plasma enhanced chemical vapor deposition (PECVD), atomic layer deposition (ALD), thermal evaporation, sputtering, and combinations thereof. The intensity of the light received by CMOS imager 320 is essentially modulated by the heat signature of the scene from which radiation is received at optical filter 310.

Figure 4:
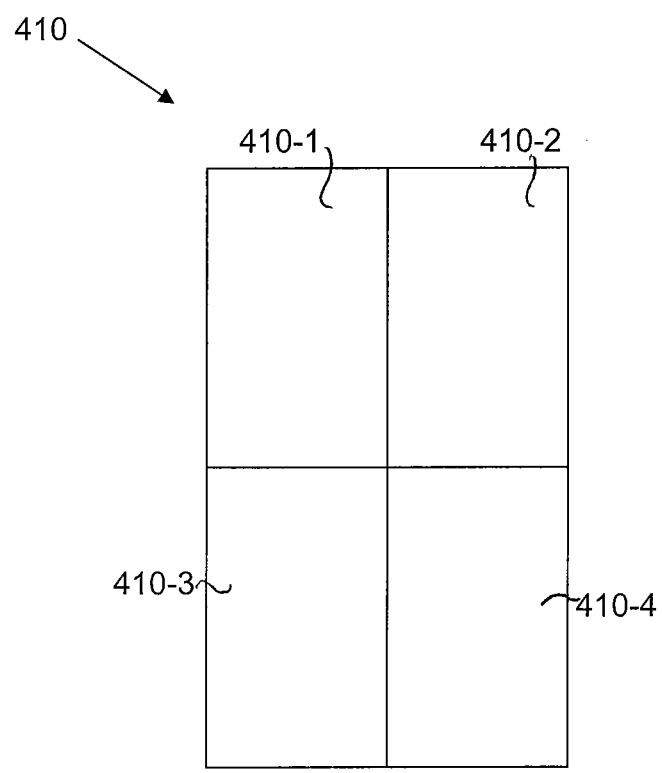
FIG. 4 shows an embodiment of an optical filter partitioned into a number of regions, where each region has optical characteristics different from the optical characteristics of the other regions.

FIG. 4 shows an embodiment of an optical filter 410 partitioned into a number of regions 410-1 ... 410-4, where each region has optical characteristics different from the optical characteristics of the other regions. Though four regions are shown in FIG. 4, the number of regions is not limited to four regions but may include any number of regions. The number of regions may depend on the application.

A CMOS imager may be subdivided into n×m sections (though a quad is shown in FIG. 4) by varying the doping of corresponding filters from section to section. The doping determines which IR waveband is absorbed. Each section absorbs a distinct and different waveband relative to the other sections. In an embodiment, the sections or regions include at least on region having characteristics relative to wavelengths in the range from 3 μm to 16 μm. The regions may be further partitioned within the 3 μm to 16 μm wavelength such as the wavelength range from 8 μm to 12 μm.

An apparatus can be configured such that each section contains an identical image of a scene from which radiation is received. Manipulation between sections allows for the separation of scene components as a basis of IR emission/reflection characteristics. After a teaching process is conducted for an analysis unit, manipulation within each section allows for the identification of the presence of scene components, identification of their vectorial relationships with each other, and, depending on the level of the teaching process, identification of the components. The partitioned structure may be used in the identification of humans and their movement through a cluttered industrial environment, identification of constituents within chemical spills, contaminants with a work environment, and the health of machines and electrical subsystems for maintenance applications.

The arrangement of different materials for an embodiment of an optical filter can be tuned and tweaked for various wavelengths in the infrared, depending on the application. With different applications, different materials for semiconductor structures and/or different doping levels for the semiconductor may be realized to provide basically the structure itself as resonant structure for visible light for the given application. With the half wave element in the Fabry-Perot stack of a different material that relates to different wavelengths, different semiconductor materials can be used that absorb at different wavelengths. In an embodiment, an optical filer is tuned to four regions: one centered on 3 μm, one centered on 7 μm, one centered on 8 μm, and one centered on 11 μm. In an embodiment, analysis of output from use of a multiple sectioned optical filter tuned for an application can be directed to analyzing radiation received in the 3-5 μm band, radiation received in the 6-14 μm and radiation received around 20 μm to correspond to different objects. The correlation may be initiated in a training process of the signal processing equipment used in the application. For instance, detection in the 3-5 μm micron range may correlate to a thermal signature of chemical activity such as a chemical spill. Chemical activity may be also be analyzed by sensing infra-red radiation emitted from the chemical material on exposure to light incident on the chemical. Other activity may be correlated to emitted infra-red radiation by collecting information on emitted radiation with respect to motion and time to further categorize the sensed activity.

An embodiment of an apparatus having an optical filter and imager, structured according to an embodiment as taught herein, may be arranged in packaging to operate in severe working conditions associated with industrial applications. Such packaging may be structured to meet environmental standards for operating in various industries. In addition, the circuitry in the packaged apparatus can include self-checking dual channels that communicate with each other. If there is a failure in one channel, the other channel can still be used to shut down machines being monitor or to provide other safety-based operations of the monitored machines.

Figure 5:
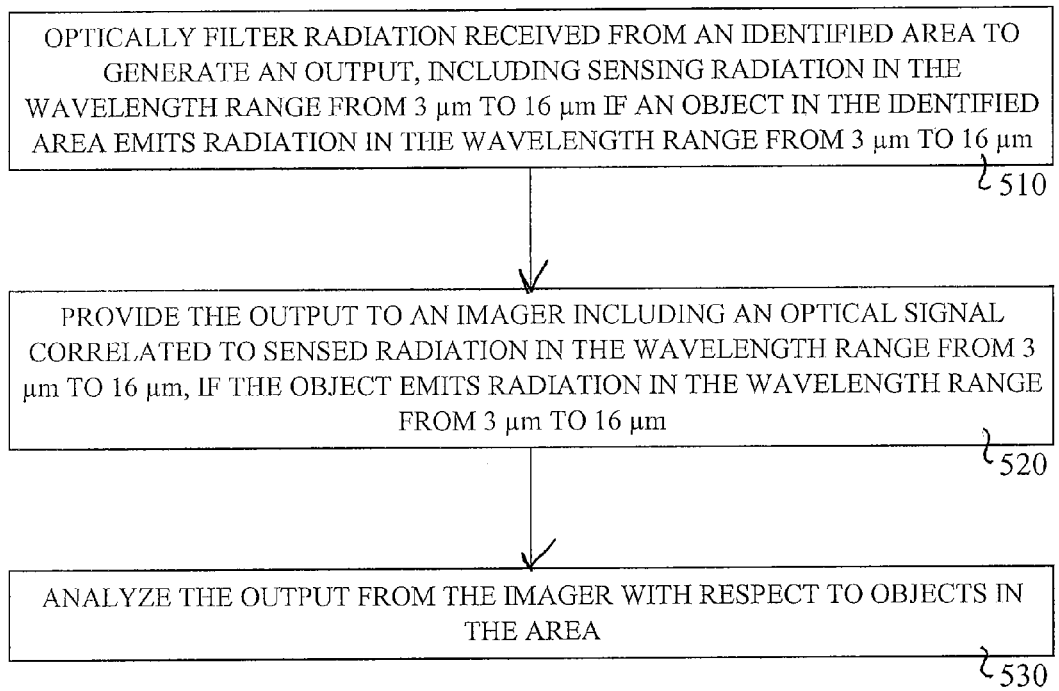
FIG. 5 shows features of an embodiment of a method that uses infra-red light in camera applications.

FIG. 5 shows features of an embodiment of a method that uses infra-red light in camera applications. The method includes sensing radiation that may be emitted in wavelength range from 3 μm to 16 μm. At 510, radiation received from an identified area is optically filtered to generate an output. The identified area is a region selected through orientation of a sensing optical filter or a sensing optical filter arranged with one or more optic components, such as but not limited general reflectors, broadband reflectors, narrowband reflectors, lenses, and other optics such that radiation emitted from objects in the region is directed to the optical filter. The identified area is in an effective field of view of the optical filter. The filtering may include sensing radiation in the wavelength range from 3 µm to 16 µm, if an object in the identified area emits radiation in the wavelength range from 3 µm to 16 µm. For example, a person radiates infra-red radiation in the wavelength range from 8 µm to 12 µm.

With person in the effective field of view of the optical filter, the radiation from the person can be filtered by the optical filter, which can generate an output having a signal correlated to the sensed radiation from the person. Idle machinery typically emits infra-red radiation at wavelengths significantly less than wavelengths emitted from people allowing for differentiation between people and machines. Operating machinery produce heat as they function, providing an increased wavelength over its idle state though typically at wavelengths less than emitted by people. In a situation in which the operating machinery overheats, that is, generates heat in excess of the heat normally generated in operation, the emitted infra-red radiation is at wavelengths larger than normally associated with its typical operating conditions. Monitoring changes in the infra-red radiation generated by machinery provides a mechanism to manage the operation of the machinery such that, if overheating could lead to equipment malfunction or a hazardous condition, the machinery can be shut-down or regulated to operate at levels to reduce such overheating. Other objects in the effective field of view of the optical filter may be detected based on the radiation emitted from these objects.

At 520, an output is provided from the optical filter to an imager. The output may include an optical signal correlated to sensed radiation in the wavelength range from 3 µm to 16 µm, if one of more objects in the area emitted radiation in the wavelength range from 3 µm to 16 µm. The output to the imager may be provided as light having wavelengths in the visible spectrum. This visible light may be provided by using an optical filter configured to translate received infra-red light into visible light. Various infra-red wavelengths may be converted to various wavelengths of visible light to differentiate between different objects in the effective field of view of the optical filter. The visible light may be directed to a CMOS imager. Other imagers, such as CCD imagers, may be used.

At 530, the output from the imager is analyzed with respect to objects in the area. In an embodiment, the output from the imager may be analyzed by manipulating data collected from optically filtering radiation emitted from objects in the identified area using an optical filter partitioned into a plurality of regions. Each region receives the radiation and provides a signal correlated to a specific wavelength range. The wavelength range for each region is different from the other regions of the optical filter. With knowledge of the wavelengths from the different regions, the output of the imager may be manipulated to determine status and movement of objects in the identified area.

The analysis may include a determination that a safety hazard event has occurred in the identified area. The identified area may be a commercial area in which industrial activity is conducted. A safety hazard event may include a person moving within a specified distance of machinery. The level of the safety hazard event may depend on the status of the machinery such as whether of not the machinery is operating, the level of operation of the machinery, or various combinations of factors. Analysis can include monitoring the output of an imager over time to determine that a machine is overheating. The determination of the overheating may be a safety hazard event that is followed by shutting down the machine. Alternatively, the determination of the overheating may be a safety hazard event that is followed by adjusting operation of the machine such that the operating temperature of the machine is brought below a threshold temperature that may be set as a threshold level upon which a safety hazard event is defined. Other safety hazard events may include, but are not limited to, identification of constituents within chemicals spills within the sensed area, contaminants within the sensed area, identification of the health of machines and electrical subsystems for maintenance applications, and combinations such events.

The identification of safety hazard events may be realized using a system incorporating various embodiments of an optical filter, imager, and signal processor in which radiation emitted from a specified area, such as a work area, is directed to the optical filter with the system subjected to a teaching process. A teaching process allows standard objects in the specified area to be identified as components of the specified area and may include the generation of vectorial relationships among the objects in the specified area. The teaching process may include defining spectral characteristics for people and correlating the change of such spectral characteristics across the specified region as motion of a person based on changes of the spectral characteristics at different regions in the image provided by the imager. In various embodiments, the output of the imager is analyzed using software. The software may be provided as a set of machine-executable instructions on a machine-readable medium, such as a computer-readable medium, having computer-executable instructions, processed by one or more processors to analyze the output of the imager with respect to objects in the specified area. The instructions can provide management of operating functions in response to the analysis.

In an embodiment, vector motion of a person in a scanned area may be analyzed. A teaching procedure can be implemented to determine the vector motion. For example, settings may be made in control circuitry or software to determine distances by forming ratios of the relative heights to pixel heights. The change in distance with time may be used to relate motion of objects relative to other objects in the field of view of a camera using infra-red light to effectively scan an area. The teaching process may also be conducted to isolate ambient environments from changes in the environment to eliminate noise factors. Such noise factors and ambient conditions may be isolated from other activity in the scan area. In an embodiment, the teaching process can provide for ignoring certain objects moving into a scan area. For example, motion of people may be ignored when the machinery in the scan area is in particular operations conditions such as to impose a risk. In instances, machinery being off poses no risk. For a particular scan area, motion of an individual can be ignored, if the motion is not in or directed to a subsection of the scan area. Such a subsection may have been identified in analysis as an operational area or an area subject to some safety hazard event. With each human face having a unique thermal sensing signature that changes with age, the teaching process may be conducted to identify particular individuals. In various embodiments, signal processing associated with an optical filter and imager using infra-red light may be configured to identify the differences between various operations and activities in the effective field of view of the optical filter.

The results from analyzing output from the imager may be used to regulate directly objects sensed by the optical filter/imager configuration. In addition, signals may be generated from the results and transmitted over a communications network. The objects may be managed using the communications network. Signals generated from the results and transmitted over a communication network may provide information to other systems. The information may include safety reports, safety alarms, status of the objects in the sensed area, historical data with respect to the objects in the sensed area, and other information. The communications network may be a local area network (LAN), a wide area network (WAN), a wireless network, the Internet, a public network, a private network, and/or combinations thereof.

Figure 6:
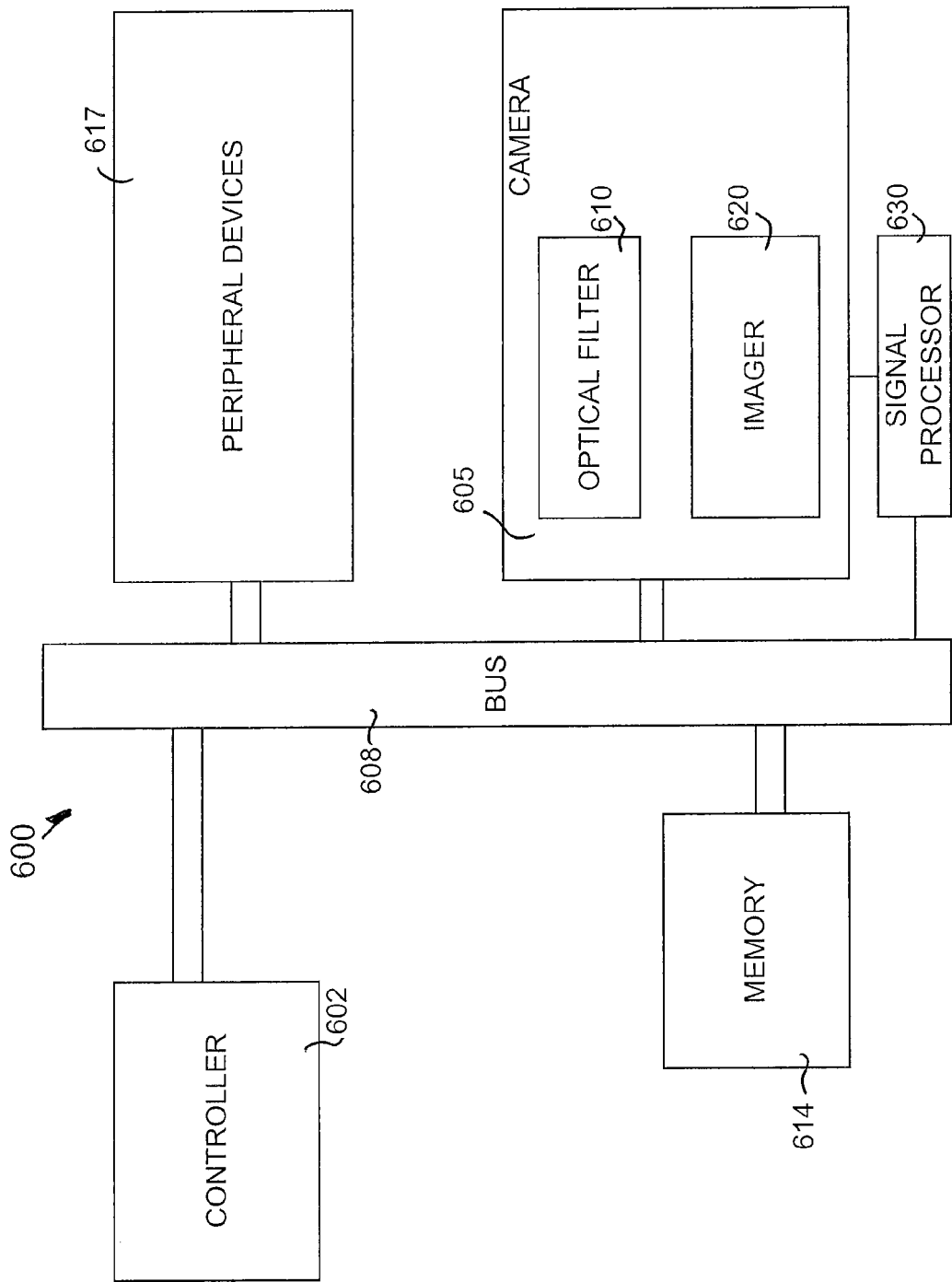
FIG. 6 illustrates a block diagram of features of an embodiment of a system having an optical filter and imager that use infra-red light in camera applications.

FIG. 6 illustrates a block diagram of features of an embodiment of a system 600 having an optical filter 610 and imager 620 that use infra-red light in camera applications. Optical filter 610 may be used to sense light of different wavelengths, including wavelengths in the range from 3 µm to 16 µm for operation of camera 605. The camera may be arranged as a safety camera. System 600 may include a controller 602 and a bus 608, where bus 608 provides a communication path between controller 602 and camera 605. Camera 605 and its associated filter 610 and imager 620 may be realized in various embodiments including the embodiments discussed with respect to FIGS. 1-5.

In an embodiment, controller 602 is a processor. Bus 608 may be a parallel bus. Bus 608 may be a serial bus. Bus 608 may be compatible with Peripheral Component Interconnect (PCI) or with PCI express. Bus 608 may be a collection of different transmission mediums among the various components of system 600. In an embodiment, system 600 may include a memory 614 and an additional peripheral device or devices 617 coupled to bus 608. Peripheral devices 617 may include one or more displays, alphanumeric input devices, cursor controls, memories, one or more network communications interfaces, and/or other control devices that may operate in conjunction with controller 602. Various components of system 600 may be realized with a hardware configuration, a software based configuration, or combination of hardware/software configurations.

In an embodiment, controller 602 includes control circuitry to manage the operation of camera 605. Controller 602 may be integral to packaging in which camera 605 is arranged. Controller 602 and camera 605 may be integrated onto a common chip or chip set. Controller 602 may manage the analysis of output from imager 620 to monitor an area scanned by camera 605 to determine the occurrence of a safety hazard event. Controller 602 may be responsive to operation of camera 605 to initiate safety actions.

In an embodiment, controller 602 is external to a camera 605. Through signals provided on bus 608, controller 602 in conjunction with memory 614 and peripheral devices 617 may monitor and/or manage the operation of camera 605 relative to objects in an area in the field of view of camera 605 and objects that move into the area. Bus 608 may be arranged as a parallel communication path, a serial communication path, and/or individual connections, depending on the application. The management may include performing training procedures for identifying objects that are in or enter within the field of view of camera 605. The management may include shutting down machinery in response to the sensing of an object in the control area of camera 605. The management may include varying operating conditions of machinery in response to the sensing a malfunction of the machinery that is correlated to a change in operating temperature for the machinery. The management may include generating signals to provide visual and/or audio alarming. The management may include transmitting signals to other systems, via an interface to a network on which the other systems have communication paths, regarding a safety hazard event and/or status related to objects in an identified area. The communications interface may be included with peripheral devices 617. In an embodiment, with controller 602 external to the housing for camera 605, housing for camera 605 may include another controller to operate camera 605. The additional controller may operate in conjunction with external controller 602.

Various embodiments or combination of embodiments for apparatus and methods for using infra-red radiation in camera applications, as described herein, can be realized in hardware implementations, software implementations, and combinations of hardware and software implementations. These implementations may include a machine-readable medium having machine-executable instructions, such as a computer-readable medium having computer-executable instructions, for performing operations to regulate the operation and response management of a camera having an optical filter and imager to use infra-red light. The machine-readable medium is not limited to any one type of medium. The machine-readable medium used will depend on the application using an embodiment of an optical filter and imager to use infra-red light in camera applications.

Various embodiments using a safety camera as discussed herein may provide for operation in relatively high optical noise environment substantially without reduction in dynamic range and utility for the safety camera. Further, such embodiments may lower the costs of performing thermographic sensing relative to other methods for sensing thermal radiation. When used in a safety camera application, the identifying metric may be provided as the unique thermal signature that is given off or reflected by the object in or moving into the area of concern. Such a safety system may restrict the wavelength range by using thermographic sensing to properly identify and make action relative to activity in the area of concern. Various embodiments provide for reduced size and weight of thermographic based safety cameras due to the lack of a cooling system to reduce ambient system noise. In an embodiment, an optical filter is used to transfer pictorial information content in the mid and far infra-red wavebands into the visible waveband. The resulting light in the visible waveband may be used to isolate a CMOS imager from the thermal noise in which the CMOS imager resides such that substantially only the infra-red scene that is imaged onto the optical filter is detected.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description.

What is claimed is:

1. An apparatus comprising:
   an optical filter physically partitioned into a plurality of regions on a common structure such that each region is arranged to concurrently receive radiation from one or more objects, the concurrently received radiation being from the same one or more objects, each region configured to sense a different wavelength range of radiation; and
   an imager to receive an input from each of the regions of the optical filter, the imager subdivided into a plurality of sections, wherein each region includes layered semiconductor material such that differences in material between the regions provide differences in optical absorption of the regions.

2. The apparatus of claim 1, wherein first wavelength range includes wavelengths of infra-red radiation.

3. The apparatus of claim 1, wherein the optical filter is structured to provide the optical signal to the imager including spatially modulated radiation having a wavelength in the visible spectrum.

4. The apparatus of claim 1, wherein the apparatus includes a signal processor such that the signal processor is configured to determine an object the one or more objects in the area, the determination based on the received radiation corresponding to a thermal signature of the object.

5. The apparatus of claim 1, wherein the apparatus includes a memory device having stored data to identify the one or more objects in the area based on the received radiation.

6. The apparatus of claim 5, wherein the data includes data generated from a training process.

7. The apparatus of claim 5, wherein the data includes data to determine motion, data to differentiate people from non-human objects, data to determine an overheating condition of machinery, data to determine constituents within chemical spills within the area, or combinations thereof.

8. An apparatus comprising:
an optical filter physically partitioned into a plurality of regions on a common structure such that each region is arranged to concurrently receive radiation from one or more objects, the concurrently received radiation being from the same one or more objects, each region configured to sense a different wavelength range of radiation, at least one region of the plurality of regions structured to convert received radiation having a first wavelength to radiation at a second wavelength different from the first wavelength, the received radiation converted to the radiation at a second wavelength without converting the received radiation to an electrical signal; and
an imager to receive an input from each of the regions of the optical filter, the imager subdivided into a plurality of sections.

9. The apparatus of claim 8, wherein the optical filter, the imager, and a signal processor are disposed in a chip set.

10. The apparatus of claim 8, wherein the apparatus includes:
a memory device having instructions stored thereof to perform safety-based operations using analysis of the output from the imager;
a processor to execute the instructions; and
a communication interface to transmit a signal indicative of an occurrence of a safety event in the area.

11. The apparatus of claim 10, wherein the signal indicative of occurrence of the safety event in the area includes a command signal to control machinery in response to the analysis determining existence of a safety hazard.

12. The apparatus of claim 8, wherein each region of the optical filter is structured to provide an optical signal converted from the concurrently received radiation, the converted optical signal in each respective region being radiation converted from the received radiation at a wavelength in the sense wavelength range of the respective region to radiation at a wavelength different from the sense wavelength range, the optical signals converted from the concurrently received radiation without converting the concurrently received radiation to an electrical signal.

13. The apparatus of claim 12, wherein at least one of the optical signals has a wavelength in a wavelength region that is different from another wavelength region in which another of the optical signals has a wavelength.

14. The apparatus of claim 8, wherein a region of the plurality of the regions is structured to sense infra-red radiation in a wavelength range to detect a person.

15. A method comprising:
optically filtering radiation received at an optical filter from an identified area and providing, from the optical filter, an optical signal converted from the received radiation, the received radiation having a wavelength in a first wavelength range, the optical signal having a wavelength in a second wavelength range that is different from the first wavelength range, the optical signal converted from the received radiation without converting the received radiation to an electrical signal;
receiving the optical signal at an imager; and
analyzing output from the imager using a signal processor, based on the optical signal, associated with the identified area from which the received radiation was provided to the optical filter, wherein analyzing the output from the imager includes manipulating data collected from optically filtering radiation emitted from one or more objects in the identified area, the optical filter having a structure partitioned into a plurality of regions where each region receives the radiation and provides an optical signal correlated to a specific wavelength range, the specific wavelength range for each region different from the other regions of the optical filter.

16. The method of claim 15, wherein receiving the optical signal at the imager optically filtering radiation received at the optical filter includes receiving the optical signal including spatially modulated visible light.

17. The method of claim 15, wherein the method includes adjusting operation of a machine based on analyzing the output from the imager associated with the identified area.

18. The method of claim 15, wherein the method includes transmitting information on a communication network based on analyzing the output from the imager associated with the identified area.

* * * * *

UNITED STATES PATENT AND TRADEMARK OFFICE
CERTIFICATE OF CORRECTION

PATENT NO. : 8,934,048 B2  
APPLICATION NO. : 13/692404  
DATED : January 13, 2015  
INVENTOR(S) : Leard et al.

Page 1 of 1

It is certified that error appears in the above-identified patent and that said Letters Patent is hereby corrected as shown below:

In the Claims

In column 9, line 7, in Claim 4, after "determine", delete "an object", therefor Signed and Sealed this
Twenty-eighth Day of July, 2015

Michelle K. Lee
*Director of the United States Patent and Trademark Office*